July 3, 1951  M. ENGELMANN  2,559,290
FRAME FOR OPTICAL MIRRORS
Filed Sept. 21, 1950

Max Engelmann  INVENTOR.

BY

Patented July 3, 1951

2,559,290

UNITED STATES PATENT OFFICE 2,559,290

FRAME FOR OPTICAL MIRRORS

Max Engelmann, Wetzlar/Lahn, Germany, assignor to Ernst Leitz, G. m. b. H., Wetzlar, Germany, a corporation of Germany Application September 21, 1950, Serial No. 186,033
In Germany January 9, 1950

2 Claims. (Cl. 88—96)

The object of this invention is to provide a novel and improved frame for optical mirrors. The invention is of particular advantage in framing mirrors for microscopes. The invention is characterized by that the mirror, which may consist of one or more mirror elements, is held within an annular frame consisting of two rings, one fitting within the other. The inner ring is provided with yieldable deformable portions which engage an annular recess in the outer ring. When the inner ring is inserted in the outer ring, the said portions bend inwardly to pass within the outer ring, but when they come opposite the outer annular recess, they automatically snap into the same whereby the two rings become firmly united and no other securing means are required.

The mirror may be swingably mounted in the usual forked support on a microscope. The support has pivots which are seated in sockets in the outer ring. The sockets are bored through to the annular recess so that when the mirror is removed from the support, one may depress the yieldable deformable portions inwardly to separate the two rings for any desired purpose.

Figure 1:
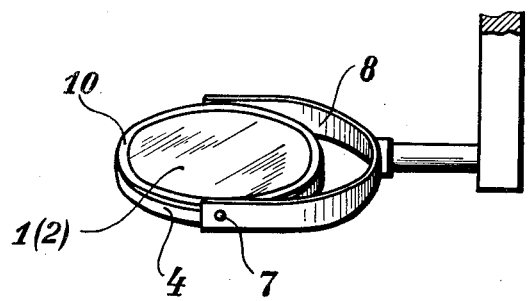
Figure 2:
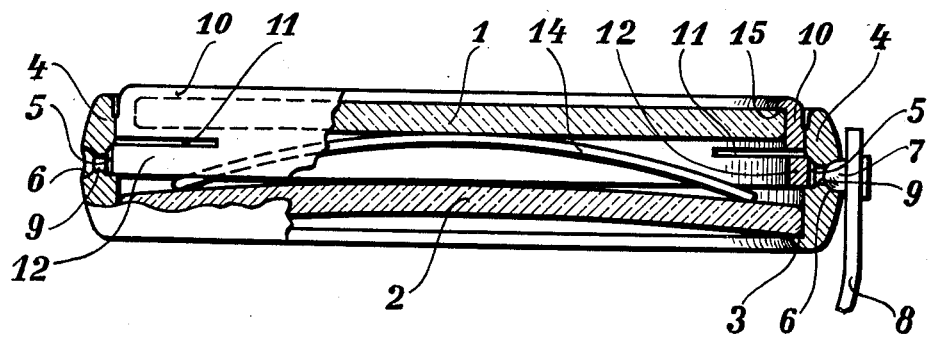

In the accompanying drawing Figure 1 shows the mirror mounted in the forked support, and Figure 2 is a side view of the framed mirror, parts being in section and parts broken away.

The microscope mirror consists of two mirror elements, a plane mirror 1 and a concave mirror 2. The latter rests upon a flange 3 at the bottom of the outer frame ring 4 which has an annular recess 5 and diametrically opposite sockets 6 to receive the pivots 7 of a forked mirror support 8. The sockets are bored through into the recess as shown at 9.

The plane mirror 1 is contained within the inner ring 10 which fits closely slidably within the outer ring 4 and which is slotted as at 11 to provide diametrically opposite yieldable deformable portions 12. When the ring 10 is inserted within the ring 4, the portions 12 will be pressed inward so that the inner ring may be pressed down into and within the outer ring. When the portions 12 come opposite the recess 5 they will automatically snap into said recess and the two rings will be firmly united.

In assembling the device, the lower mirror 2 will be placed upon the bottom flange 3 and a spring 14 will be placed upon the mirror. Thereafter the mirror 1 will be laid within the ring 10 against a flange 15 thereof. Then the two rings will be united by pressing the inner ring down into and within the outer ring, the spring 14 being slightly flattened to hold the mirrors against their respective flanges on the rings.

The frame is then mounted in the usual manner by inserting it in the forked support 8. When for any reason it is desired to remove the mirrors, the frame is snapped away from the support pivots 7. Thereafter one may by finger pressure applied through the bores 5 press the portions 12 inwardly in the inner ring to lift the latter up out of the outer ring.

The device has the advantage of being easily and inexpensively manufactured, assembled and disassembled. Another advantage is, that the mirrors need not be faceted to fit within special bend over flanges.

I claim:

1. A device of the character described comprising an inner ring and an outer ring, the inner ring fitting tightly slidably within the outer ring, a flange on each of said rings, a mirror element within each ring resting against the flange thereof, a spring between said mirror elements for supporting the same against their respective ring flanges, means for detachably uniting the said two rings to frame the said mirror elements, said means consisting of an annular recess within the outer ring and yieldable deformable portions on the inner ring automatically engaging the said recess when the inner ring is inserted within the outer ring, said portions being manually deformable to release the same from engagement with the said recess for separating the two rings, and apertures in said outer ring for manually engaging the said portions to separate the rings.

2. A device according to claim 1, characterized by pivots receiving sockets in said outer ring communicating with the said apertures, said sockets being adapted to receive the pivots of a forked microscope support.

MAX ENGELMANN.

REFERENCES CITED

The following references are of record in the file of this patent:

UNITED STATES PATENTS

| Number | Name | Date |
|---|---|---|
| 1,156,389 | Bugbee | Oct. 12, 1915 |
| 2,056,811 | Storch | Oct. 6, 1936 |